US006993615B2

(12) United States Patent  (10) Patent No.: US 6,993,615 B2
Falcon (45) Date of Patent: Jan. 31, 2006

(54) PORTABLE COMPUTING DEVICE-INTEGRATED APPLIANCE

(75) Inventor: Stephen R. Falcon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 601 days.

(21) Appl. No.: 10/295,305

(22) Filed: Nov. 15, 2002

(65) Prior Publication Data

US 2004/0098571 A1   May 20, 2004

(51) Int. Cl.
*G06F 13/00* (2006.01)
(52) U.S. Cl. .......................... 710/303; 381/86; 381/87
(58) Field of Classification Search ................ None
See application file for complete search history.

(56) References Cited

U.S. PATENT DOCUMENTS

| | | | |
|---|---|---|---|
| 5,265,238 A | | 11/1993 | Canova, Jr. et al. |
| 5,497,490 A | | 3/1996 | Harada et al. |
| 5,751,548 A | | 5/1998 | Hall et al. |
| 5,794,164 A | * | 8/1998 | Beckert et al. ............... 701/36 |
| 5,859,628 A | * | 1/1999 | Ross et al. .................. 361/686 |
| 5,859,762 A | | 1/1999 | Clark et al. |
| 5,867,406 A | | 2/1999 | Yanagisawa |
| 6,196,850 B1 | | 3/2001 | Dietz et al. |
| 6,246,935 B1 | * | 6/2001 | Buckley ...................... 701/36 |
| 6,366,840 B1 | * | 4/2002 | Buckley ...................... 701/36 |
| 6,459,969 B1 | | 10/2002 | Bates et al. |
| 6,577,928 B2 | * | 6/2003 | Obradovich .................... 701/1 |
| 6,622,083 B1 | * | 9/2003 | Knockeart et al. .......... 701/202 |
| 6,636,918 B1 | * | 10/2003 | Aguilar et al. .............. 710/303 |
| 2003/0128504 A1 | * | 7/2003 | Enners et al. ............... 361/683 |
| 2003/0215102 A1 | * | 11/2003 | Marlowe ...................... 381/77 |

FOREIGN PATENT DOCUMENTS

WO    WO 99/38728    *   8/1999

OTHER PUBLICATIONS

Wall, Holger; Car Radio With A Removable Control Panel; WO 99/38728, English language translation; Publication date May 8, 1999.*
Adam Z Lein, pocketnow.com—Review—"Compaq Computer Corporation's GSM/GPRS Wireless Expansion Pack," Apr. 4, 2002, pp 1-19, printed Oct. 11, 2002.
Christopher Spera, pocketnow.com—Review "PDA Mounts with a Twist—Arkon Resources' PDA Multimedia Mounts," Aug. 20, 2001, pp. 1-16, printed Oct. 11, 2002.

(Continued)

*Primary Examiner*—Glenn A. Auve
(74) *Attorney, Agent, or Firm*—Lee & Hayes, PLLC (57) ABSTRACT

In accordance with one aspect, a portable computing device determines a type of an appliance in which the portable computing device is docked. The portable computing device identifies, based on the type of the appliance, a user interface configuration for the portable computing device, and configures the user interface of the portable computing device in accordance with the identified user interface configuration. In accordance with another aspect, a car stereo includes a docking station into which an off-the-shelf handheld computer can be docked. The car stereo also includes an input/output (I/O) component that allows the car stereo to communicate with the handheld computer when the handheld computer is docked in the docking station of the car stereo. In accordance with another aspect, an appliance in which a portable computing device can be docked is an integrated vehicle stereo and portable computing device docking station.

24 Claims, 9 Drawing Sheets

OTHER PUBLICATIONS

Christopher Spera, pocketnow.com—Review—"Still Rockin' Down the Highway—Arkon's iPAQ Multimedia Pedestal," Jun. 5, 2002, pp. 1-12, printed Oct. 11, 2002.

Comworxx Inc. Presents Ready-to-Ship Port-IT(TM): Voice-Activated Telephone, Dynamic Navigation and Hands-Free Information Browsing, Las Vegas, Jan. 8, 2002, pp 1-3, printed Oct. 11, 2002.

Dan Hanttula, SemperAptus.com "The Future of the Pocket PC," pp 1-4, printed Oct. 11, 2002.

* cited by examiner

PORTABLE COMPUTING DEVICE-INTEGRATED APPLIANCE

TECHNICAL FIELD

This invention relates to computing devices, and particularly to portable computing devices and portable computing device-integrated appliances.

BACKGROUND

Portable computing devices, such as handheld PCs and personal digital assistants (PDAs) are becoming increasingly popular. Such devices provide users with a relatively small, portable device that can run various programs. A wide variety of such programs exist, including entertainment programs, reference programs, spreadsheet programs, word processing programs, calculators, and so forth. These programs allow the portable computing devices to provide desired functionality to a wide range of users in a wide range of environments and situations.

However, one problem encountered with portable computing devices is how the user is to use the device in various environments. For example, it is relatively easy for a user to hold the portable computing device in the palm of one hand and activate its functionality with the other hand while sitting in a waiting room. Other environments, however, do not allow such ease of use. For example, it is generally considered unsafe behavior for a user to use both hands to operate his or her portable computing device while driving a car.

Some solutions to this problem in the car environment provide a cradle for holding the portable computing device. Such a cradle is typically mounted to the dashboard or some other part of the car and has a stand or "gooseneck" that allows the device to be positioned so that it can be better viewed by the user. While such solutions alleviate the need for the user to hold the device in one of his or her hands, they still suffer from being cumbersome to the user in the car environment.

Thus, an improved way to hold portable computing devices is needed.

SUMMARY

A portable computing device-integrated appliance is described herein.

In accordance with one aspect, a portable computing device determines a type of an appliance in which the portable computing device is docked. The portable computing device identifies, based on the type of the appliance, a user interface configuration for the portable computing device, and configures the user interface of the portable computing device in accordance with the identified user interface configuration.

In accordance with another aspect, a car stereo includes a docking station into which an off-the-shelf handheld computer can be docked. The car stereo also includes an input/output (I/O) component that allows the car stereo to communicate with the handheld computer when the handheld computer is docked in the docking station of the car stereo.

In accordance with another aspect, the appliance is an integrated vehicle stereo and portable computing device docking station.

In accordance with another aspect, an appliance having a docking station determines when a portable computing device is docked in the docking station. When the portable computing device is docked in the docking station, the appliance sends, to the portable computing device, an indication of a type of the appliance. This indication can be used by the portable computing device to configure its user interface based on the type of the appliance.

BRIEF DESCRIPTION OF THE DRAWINGS

The same numbers are used throughout the document to reference like components and/or features.

DETAILED DESCRIPTION

Portable computer-integrated appliances are described herein. Each appliance is designed to readily allow a portable computing device to be docked therein. Once docked, the portable computing device presents a user interface that is based at least in part on the type of the appliance.

Figure 1:
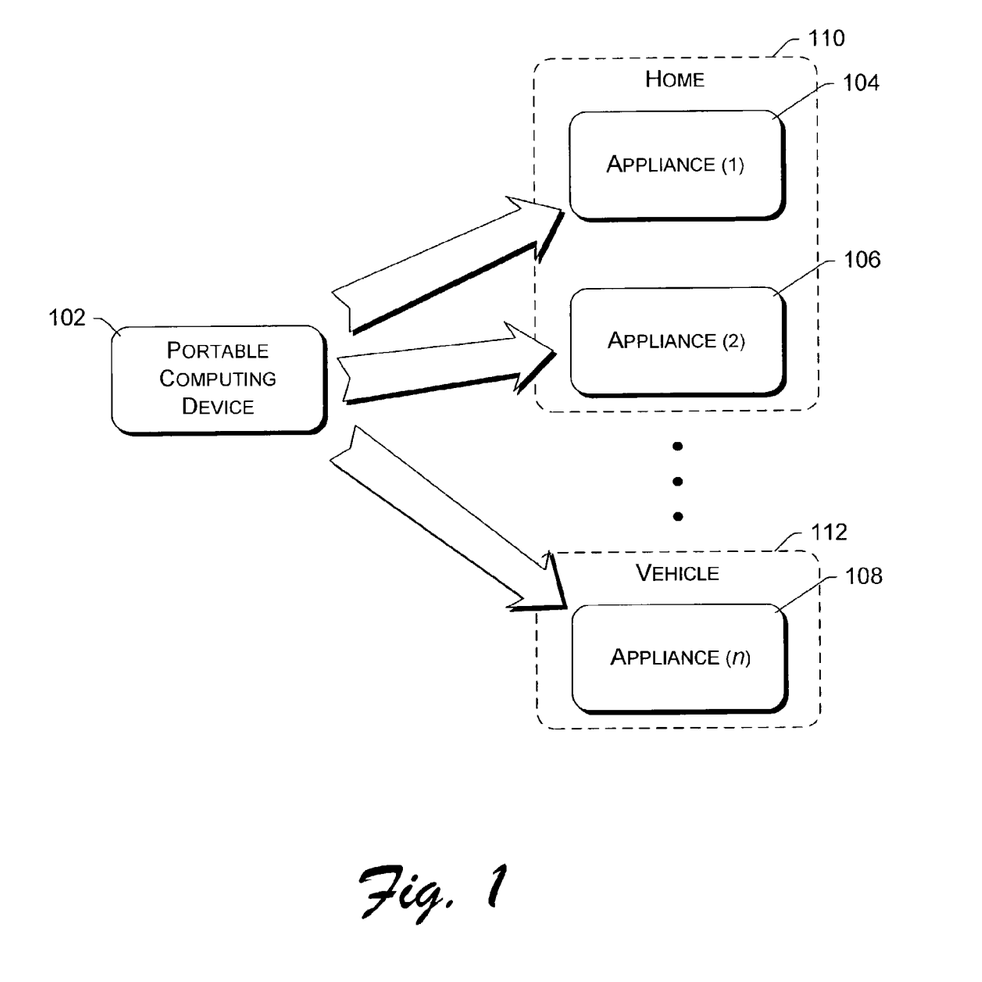
FIG. 1 is a block diagram illustrating exemplary appliances in different environments in which a portable computing device may be docked.

FIG. 1 is a block diagram illustrating exemplary appliances in different environments in which a portable computing device may be docked. FIG. 1 illustrates a portable computing device 102 and multiple (n) appliances 104, 106, and 108 into which device 102 can be docked. Appliances 104 and 106 are both in the home environment 110 and may be, for example, a home entertainment system, an automation and/or security system, an environment control system (e.g., for controlling a furnace, air conditioner, humidifier, etc.), a clock radio, a refrigeration appliance (e.g., refrigerator, freezer, refrigerator/freezer combination, etc.), an oven or range, and so forth. Appliance 108 is in the vehicle (e.g., car, truck, van, recreational vehicle, boat, etc.) environment 112 and may be, for example, a vehicle stereo or entertainment system.

Portable computing device 102 can be any of a wide variety of portable computing devices, such as a handheld or pocket computer, or a portable digital assistant (PDA) or organizer. Portable computing device 102 may also include telephone functionality (e.g., cellular telephone functionality). Examples of portable computing device 102 include: any of the Treo or Visor families of communicators or organizers available from Handspring, Inc. of Mountain View, Calif.; any of the Palm handheld devices available from Palm, Inc. of Milpitas, Calif.; any of the Cassiopeia family of personal PCs available from Casio Computer Co. of Dover, N.J.; any of the CLIÉ line of handheld devices available from Sony Corporation of America New York, N.Y.; any of the Jornada or iPAQ families of pocket PCs available from Hewlett-Packard Co. of Palo Alto Calif.; and so forth.

Figure 2:
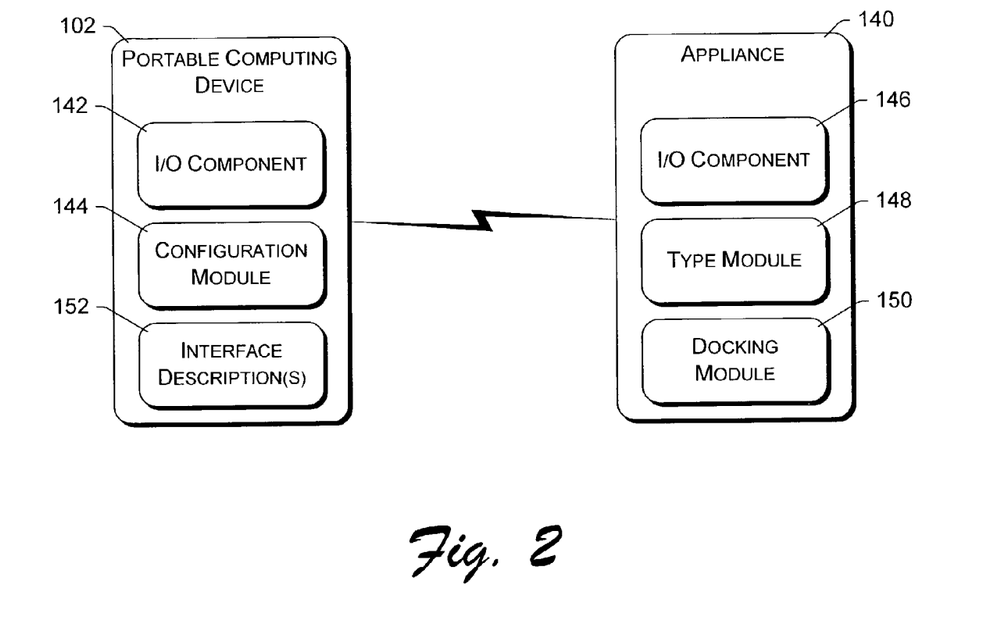
FIG. 2 is a block diagram illustrating a portable computing device and appliance in additional detail.

It should be noted that any of a variety of off-the-shelf portable computing devices, such as those discussed above, can be used as portable computing device 102. Such an off-the-shelf portable computing device may require an additional program(s) to be installed thereon to provide the functionality of configuration module 144 (and possibly to provide at least some of the functionality of I/O component 142). Such program(s) can be obtained in any of a variety of manners, such as downloading the program(s) from a server over the Internet, obtaining a pluggable module or card including the program(s), and so forth.

Portable computing device 102 can be docked in a docking port of any of appliances 104, 106, and 108. Docking portable computing device 102 into an appliance refers to physically placing the device into a receptacle of the appliance. When the portable computing device is both docked in an appliance and turned on, the portable computing device presents a user interface that is appropriate to that appliance as well as the environment that the appliance is in. Depending on the type of the appliance in which the portable computing device is docked, the portable computing device may make additional functionality available to the appliance.

FIG. 2 is a block diagram illustrating a portable computing device and appliance in additional detail. The portable computing device 102 of FIG. 2 is the same portable computing device 102 as in FIG. 1, and the appliance 140 in FIG. 2 can be any of the appliances 104, 106, or 108 of FIG. 1.

Portable computing device 102 includes an I/O component 142 and a configuration module 144. Appliance 140 includes an I/O component 146, a type module 148, and a docking module 150.

I/O component 142 includes hardware and optionally software and/or firmware that allows portable computing device 102 to communicate with appliance 140 by way of I/O component 146. Similarly, I/O component 146 includes hardware and optionally software and/or firmware that allows appliance 140 to communicate with portable computing device 102 by way of I/O component 142.

Appliance 140 and a docking station for portable computing device 102 are integrated, allowing portable computing device 102 to be docked into appliance 140. Docking portable computing device 102 into an appliance refers to physically placing the device into a receptacle (also referred to as a docking port or docking station) of the appliance. The receptacle may be implemented in a variety of different ways, such as a recessed portion of the appliance into which the portable computing device can be inserted, a receptacle that can be extended for docking of the portable computing device but which can be drawn into the appliance when no device is docked (e.g., a tray that can be pulled out for docking and pushed back in and out of the way when no device is docked), one or more clips that are activated to hold the portable computing device in place, and so forth.

In one implementation, when docked in an appliance 140, a power connection is established between the portable computing device 102 and the appliance 140. This power connection can be used to power portable computing device 102 and thus conserve the battery power of portable computing device 102. If the battery or batteries of portable computing device 102 are rechargeable, this power connection can also be used to recharge the battery or batteries of portable computing device 102.

Once docked in an appliance, the I/O components 142 and 146 can communicate with one another, allowing data and commands to be passed between portable computing device 102 and appliance 140. The communication link established between I/O components 142 and 146 may be implemented in a variety of manners, such as by way of signals passed through electrical contacts of the portable computing device that are in physical contact with electrical contacts of the appliance, by radio frequency (RF) signals, by infrared (IR) signals, combinations thereof, and so forth. The exact manner in which signals are communicated between I/O components 142 and 146 can vary by device and appliance, and different devices and appliances may support different communication mechanisms. For example, one appliance may support RF signal communication, another appliance may support IR signal communication, and the portable computing device may support both RF signal and IR signal communication.

When portable computing device 102 is both docked in appliance 140 and turned on, portable computing device 102 presents a user interface which is based at least in part on the type of appliance 140 in which portable computing device 102 is docked. A configuration module 144 identifies the type of appliance that portable computing device 102 is docked in, and uses this type information to determine an appropriate user interface for portable computing device 102.

Configuration module 144 can identify the type of appliance in a variety of different manners. In one embodiment, type module 148 of appliance 140 sends a data packet including a type identifier over the communication link between device 102 and appliance 140. Appliance 140 can be pre-programmed with the type identifier (e.g., by the manufacturer, seller, or purchaser of appliance 140). Type module 148 may send the type identifier to configuration module 144 when requested by configuration module 144, or alternatively may send the type identifier to configuration module 144 without being requested to do so by configuration module 144. The type identifier can be implemented in any of a wide variety of different manners, so long as portable computing device 102 and appliance 140 both know (e.g., are programmed with) the manner in which the type identifier is implemented. For example, the type identifier may be an eight-bit number, an alphanumeric string, etc.

In another embodiment, configuration module 144 relies on a more mechanical mechanism for identifying the type of appliance. Rather than receiving a type identifier from type module 148, portable computing device 102 includes one or more sensors. In such an embodiment, appliance 140 need not include type module 148. When portable computing device 102 is docked in appliance 140, these one or more sensors are positioned to correspond to locations where protrusions from appliance 140 may be situated. The presence or absence of a protrusion at each location is used to identify the type of appliance. The number of locations that are sensed depends on the number of different types of appliances to be identified. For example, one sensor can be used to uniquely identify two ($2^1$) different appliance types, two sensors can be used to uniquely identify four ($2^2$) different appliance types, three sensors can be used to uniquely identify eight ($2^3$) different appliance types, and so forth.

The sensors can detect a protrusion at a particular location in a variety of different manners. For example, the detection may be performed optically (e.g., the protrusion may include a reflective material that is sensed, or the protrusion may break an optical beam and the breaking of the beam is sensed), or mechanically (e.g., the protrusions are positioned such that docking the portable computing device causes the protrusion to actuate a button or tab that closes (or alternatively opens) an electrical connection that is sensed).

Each type of appliance is associated with a particular environment in which that device is typically located. For example, a car stereo is typically located in the car environment, while a refrigerator or home entertainment system is typically located in the home environment. By having each appliance type associated with a particular environment, the portable computing device can be configured to present a user interface appropriate to that environment each time the portable computing device is docked in that appliance. If a particular appliance may be used in multiple environments, then the user may be requested to select the appropriate environment (e.g., the user may be presented with a request to select a "home" button or a "vehicle" button), or alternatively one of those environments may be chosen as the default (which may be subsequently changed by the user as a user preference setting).

Different user interfaces are appropriate in different environments. For example, in the vehicle environment larger buttons and text on a display may be more appropriate so that it is easier for the driver of the vehicle to see them on the display, while in the home environment smaller buttons and text may be more appropriate because the user is able to spend more time viewing the display (and is not concerned with being distracted from driving). Additionally, certain functionality may be more appropriate for certain environments rather than other environments. For example, a spreadsheet program may be less appropriate in the vehicle environment than in the home environment because of the typically small size of the cells and cell contents in the spreadsheet, while a car stereo user interface would be more appropriate for the car environment.

Configuration module 144 determines the appropriate user interface to present to the user based on the type of appliance in which the device is docked. In one embodiment, portable computing device 102 is programmed with one or more interface descriptions 152, each description describing a user interface for a particular type of appliance. Interface descriptions 152 is configured with one or more descriptions for each type of appliance into which portable computing device 102 may be docked. The interface descriptions 152 may be pre-loaded into portable computing device 102 by the manufacturer or seller of portable computing device 102, or alternatively may be added by the user of portable computing device 102 (e.g., the user may download a user interface description in a manner analogous to the downloading of software for running on portable computing device 102).

Given an identification of the type of the appliance in which the device is docked (e.g., identified in any of the manners discussed above), configuration module 144 accesses the interface descriptions 152 and searches for an appliance type that matches (e.g., is the same as) the identified type. The interface description for the appliance type that matches the identified type is retrieved and used to configure the user interface of the portable computing device.

In another embodiment, appliance 140 communicates the interface description to be used by portable computing device 102, and appropriate for the environment in which appliance 140 is located, to portable computing device 102. In this embodiment, the user, seller, or manufacturer of portable computing device 102 need not be concerned with pre-programming portable computing device 102 for each possible appliance type the device may be docked in, but rather can rely on the appliance 140 to have the interface description and transfer it to portable computing device 102. The interface description may be transferred to portable computing device 102 each time device 102 is docked in the appliance 140, or alternatively portable computing device 102 may maintain user interface descriptions so that the description need only be transferred from appliance 140 to device 102 the first time device 102 is docked in appliance 140. For subsequent dockings, device 102 can obtain the user interface description from the record it maintained.

When docked in appliance 140, portable computing device 102 can send control information to appliance 140 in order to control the operation of appliance 140. For example, the user may enter selections through the user interface of portable computing device 102 to control playback of audio content (e.g., songs from disc, radio or satellite transmission, the Internet, etc.) by an appliance 140 that is a stereo. The appropriate commands to carry out the user-entered selections are then communicated from portable computing device 102 to the stereo.

Portable computing device 102 can also send data to appliance 140 (e.g., operating as an audio source to appliance 140). The data sent to appliance 140 may be used directly by appliance 140 (e.g., MP3 (MPEG Audio Layer 3) or WMA (Windows Media Audio) audio data to be played back by an appliance 140 that is a stereo) or alternatively may be used indirectly (e.g., stored or transmitted elsewhere) by appliance 140 (e.g., data to be sent out by appliance 140 over the Internet, data to be communicated to a peripheral device coupled to appliance 140, data to be stored on a nonvolatile storage device of appliance 140, and so forth).

When docked in appliance 140, portable computing device 102 can also make use of any resources of appliance 140. For example, resources of appliance 140 may include a hard drive, a modem or other network connector (wired or wireless) to connect to the Internet, a global positioning system (GPS) receiver, and so forth. The resources may be internal to appliance 140, or alternatively external (e.g., coupled to appliance 140 via a Universal Serial Bus (USB) connector, IEEE 1394 connector, some other public or proprietary connector, etc.). Thus, by way of example, if portable computing device 102 is docked in an appliance 140 that is a car stereo, a user interface may be presented to the user that lets the user control which music is played back by the car stereo (e.g., which radio or satellite channel is tune in and played back, or which song from the car stereo's CD player or hard drive is played back), as well as access a GPS receiver and display location information to the user. Resources of portable computing device 102 may also be available to appliance 140. For example, music stored in a memory component (e.g., Flash memory) of portable computing device 102 may be made available to a car stereo for playback.

Various functionality can thus be made available to portable computing device 102 when docked in appliance 140. The appliance 140 can operate as an audio (or other data) source to portable computing device 102, such as by having a microphone for speech recognition, providing audio data from a broadcast for recording by portable computing device 102, and so forth. Storage devices of appliance 140 (e.g., a hard drive or optical disc drive (such as a CD drive or DVD drive)) may also operate as a data source for portable computing device 102. For example, GPS or other mapping data stored on a CD or DVD may be made available to portable computing device 102 by way of the optical disc drive of appliance 140. Appliance 140 can also operate as an extensible peripheral bus for portable computing device 102.

Peripheral devices can be coupled to a bus (or busses) of appliance 140 (e.g., USB, IEEE 1394, PCMCIA, etc.), and these devices thus made available to portable computing device 102 when docked in appliance 140.

Additionally, appliance 140 is designed to allow portable computing device 102 to be docked in appliance 140 and blend well with appliance 140. For example, rather than having a stand bolted to a car's dashboard, appliance 140 docks portable computing device 102 so that portable computing device 102 blends well with the car stereo. Such design improves the appearance of the appliance 140 with the portable computing device 102 docked therein, making the portable computing device 102 look as if it "belongs" or "fits in" to the appliance 140.

It should be noted that the user interface for portable computing device 102 can change (and typically does change) as it is used in different types of appliances. For example, when the user drives home from work with the portable computing device docked in the user's car stereo, the portable computing device presents one user interface. When the user gets home and docks the portable computing device in his or her home entertainment system, the portable computing device presents another user interface. Then, when the user is ready for bed and docks the portable computing device in his or her alarm clock, the portable computing device presents yet another user interface.

Figure 3:
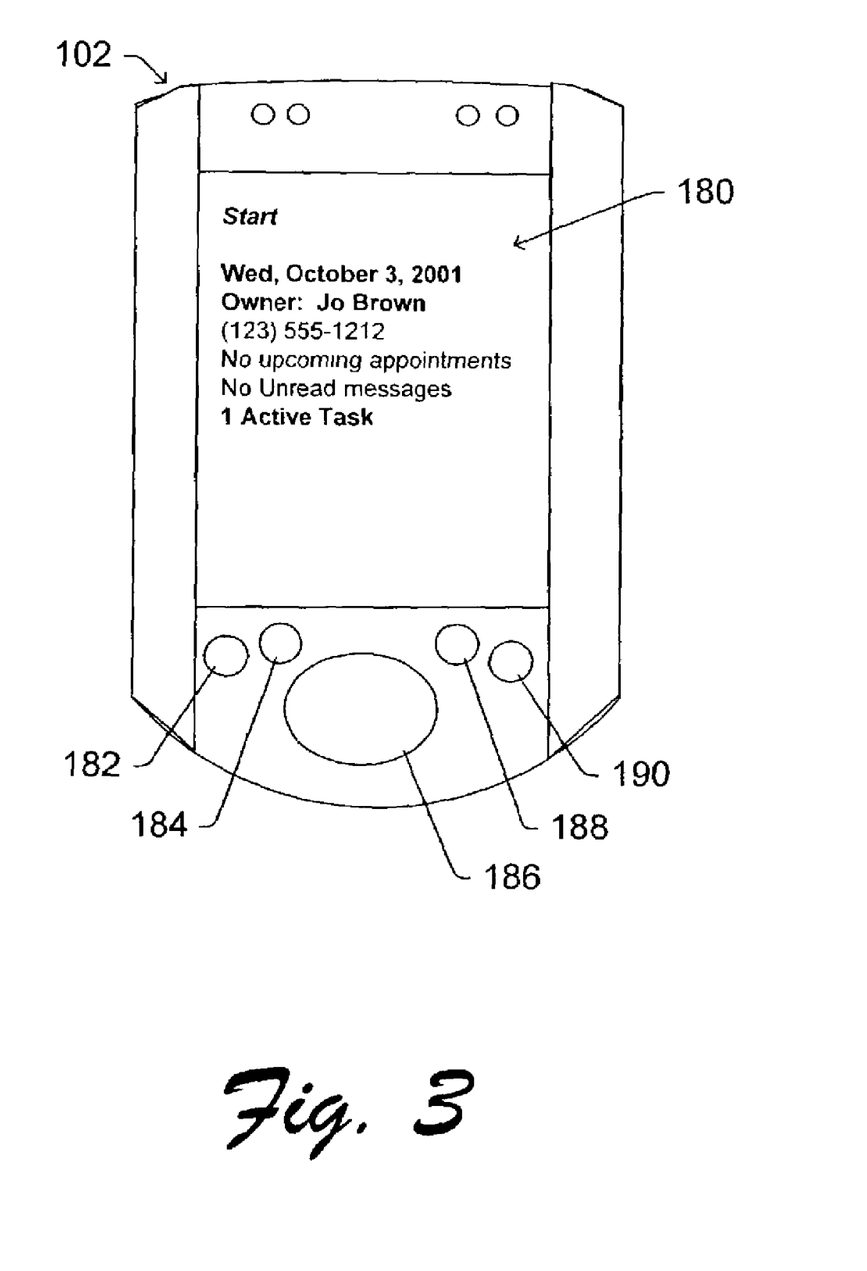
FIG. 3 illustrates an exemplary portable computing device in additional detail.

FIG. 3 illustrates an exemplary portable computing device in additional detail. In FIG. 3, portable computing device 102 is in a standalone or undocked environment (that is, portable computing device 102 is not docked in any appliance). An example user interface 180 is shown in FIG. 3, including the current date, the name and phone number of the owner of portable computing device 102, an indication of any upcoming appointments, unread messages, and active tasks. A "start" link is also included via which the user may select one or more programs to execute (e.g., analogous to the Windows® operating system start menu). A user may input commands and/or data to portable computing device 102 by selecting a portion of the user interface 180 (e.g., using a finger or stylus, if portable computing device 102 includes a touchscreen), or by pressing one of buttons 182, 184, 186, 188 or 190.

Figure 4:
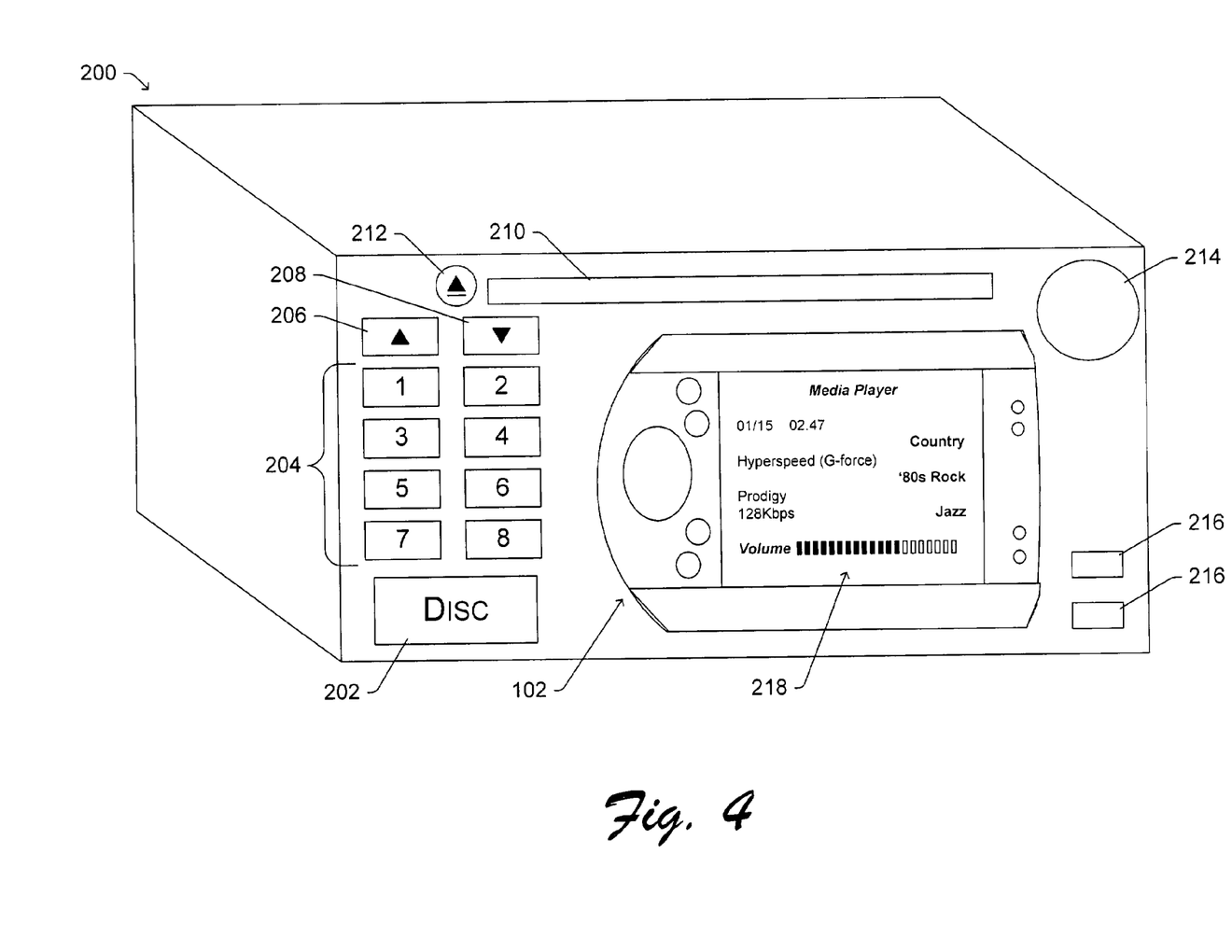
FIG. 4 illustrates an exemplary vehicle stereo while a portable computing device is docked therein.

FIG. 4 illustrates an exemplary vehicle stereo while a portable computing device is docked therein. In FIG. 4, the appliance that portable computing device 102 is docked in is car stereo 200. Although described herein with reference to a "car" stereo, it is to be appreciated that the stereo can be included in other vehicles as well, such as trucks, vans, recreational vehicles, boats, and so forth.

Car stereo 200 incorporates typical car stereo functionality, such as: the ability to tune in radio stations (e.g., an AM/FM tuner and/or satellite tuner); the ability to play back compact discs, MP3 files, or WMA files; a power amplifier; radio controls such as channel seek and scan functions; CD controls such as play, pause, stop, fast forward, rewind; base and treble control; and so forth. Car stereo 200 may include all or only some of this functionality (e.g., car stereo may not include the ability to play back MP3 files). Car stereo 200 may also include additional "automotive PC" functionality, such as: a hard drive; peripheral ports; a modem (e.g., wireless) for network (e.g., Internet) access; stereo echo cancellation circuitry; microphone input circuitry; an attached microphone; an attached push-to-talk button (e.g. allowing input for speech recognition); and so forth. Car stereo 200 may include all, none, or some of this automotive PC functionality.

Car stereo 200 includes a source display 202, eight channel pre-set buttons 204, a scan channel up button 206, a scan channel down button 208, a slot 210 for insertion and removal of optical discs (e.g., CDs, DVDs, etc.), an eject button 212 for ejecting optical discs, a volume control knob 214, and two peripheral device connectors 216 (e.g., USB ports). As illustrated, portable computing device 102 is docked in car stereo 200 such that the user interface display of the portable computing device 102 is approximately parallel to the face of stereo 200. Alternatively, portable computing device 102 may be docked in car stereo 200 such that the user interface display of the portable computing device 102 is not approximately parallel to the face of stereo 200 (e.g., offset towards or away from the driver's seat of the vehicle, docked in a moveable manner so that the display may be (but is not necessarily) parallel with the face of stereo 200, etc.).

As seen in FIGS. 3 and 4, the user interface displayed to the user is different when in the standalone environment than when docked in an appliance in the car environment. When docked, portable computing device 102 displays a user interface 218 that displays track information for the current media source being played, illustrated as "01/15" to indicate track one of fifteen total tracks (e.g., tracks on a CD, on a hard drive, in a play list, etc.) and "02:47" to indicate playback is 2 minutes and 47 seconds into track one. User interface 218 also displays the name of the disc or play list ("Hyperspeed (G-force)"), as well as the source of the disc or play list ("Prodigy") and the rate of playback for the disc ("128 Kbps"), which is an indication of the quality of the media content. User interface 218 also displays a volume level, indicating a current playback volume (by darkened boxes) relative to a maximum playback volume supported by car stereo 200. User interface 218 also includes other selectable links (Country, '80s Rock, and Jazz) of different types of music available for playback to the user. A user may input selections to portable computing device 102 via control keys on portable computing device 102 (e.g., keys 182–190 illustrated in FIG. 3), and/or a touchscreen of portable computing device 102.

Thus, when a user of portable computing device 102 enters his or her car, he or she can simply dock the portable computing device 102 in the car stereo and have the user interface automatically change to an interface appropriate to the car environment. Through the user interface, the user is able to select which media he or she would like to play back (whether its source be stereo 200 or portable computing device 102), and in response to such selection, the portable computing device 102 sends control information to the car stereo to begin playback of the selected content. When the user leaves the car, he or she can simply undock portable computing device 102, causing portable computing device 102 to return to the user interface for the standalone environment.

In one implementation, portable computing device 102 maintains a record of its current state when it is undocked from a particular type of appliance. When the portable computing device is again docked to that same type of appliance, it returns to the same state as when it was last undocked. This current state includes information describing any current resource(s) being accessed, and information describing any data being presented to the user. The exact nature of this current state can vary based on the appliance as well as the actions being performed by the user. For example, when portable computing device 102 in FIG. 4 is undocked, it can save the current media playback information (e.g., the current song (track one of "Hyperspeed (G-force)", and temporal location in that song (2 minutes and 47 seconds into track) as associated with the car stereo. The next time the user docks the portable computing device 102 into a car stereo (e.g., any car stereo), portable computing device 102 retrieves the saved information and communicates with car stereo 200 to initiate playback of track one of "Hyperspeed (G-force)" at 2 minutes and 47 seconds into track one. Alternatively, if the car stereo has a unique identifier, then the saved information can be associated with that particular identifier and playback initiated based on that saved information only when the portable computing device is again docked in that same car stereo.

It should be noted that, although a single interface form is displayed as part of user interface 218 for portable computing device 102 while docked in a car stereo, the user interface may include multiple forms. For example, one interface form may allow the user to select from different media sources (e.g., satellite radio, local radio, CD, hard disk, etc.), another interface form may allow the user to select from different resources to access (e.g., GPS, the Internet, a printer connected via a USB port 216, etc.), another interface form may allow for GPS information display (e.g., displaying a map and current location within the map), and so forth.

It should also be noted that, as part of the configuration of the user interface to an appropriate interface for the type of appliance portable computing device 102 is docked in, the orientation of the display may change. For example, as seen in FIGS. 3 and 4, the display orientation is changed by 90 degrees due to the portable computing device being docked "horizontally" in car stereo 200 rather than the normal "vertical" orientation that portable computing device 102 is held in (e.g., when being held in a user's hand). The proper orientation for the display can be included as part of the interface description for the appliance.

Figure 5:
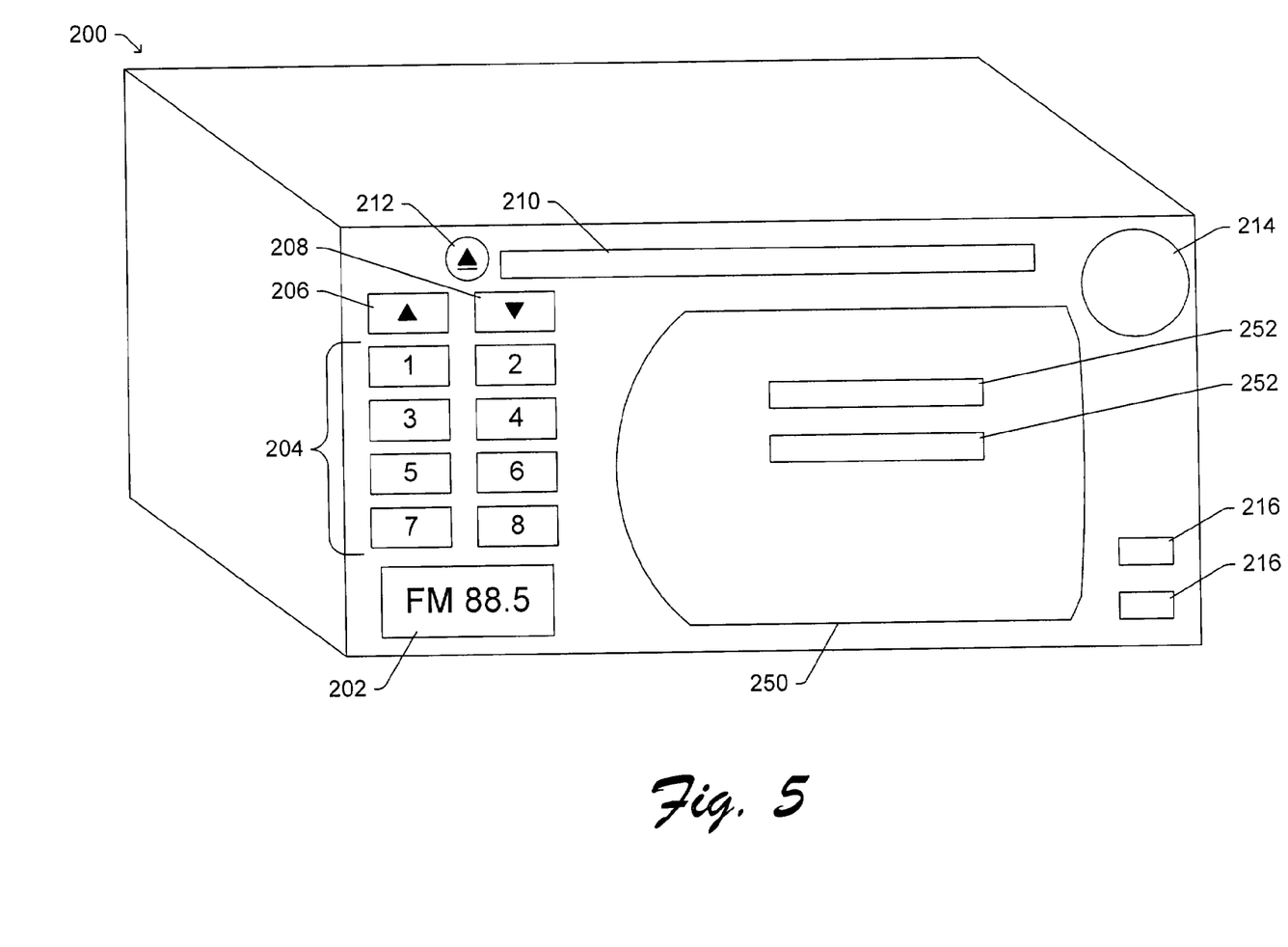
FIG. 5 illustrates the vehicle of FIG. 4, except without a portable computing device docked therein.

FIG. 5 illustrates the vehicle stereo of FIG. 4, except without a portable computing device docked therein. In FIG. 5, the source display 202 has changed to indicate a currently-tuned channel rather than a disc, and a recessed receptacle 250 that is part of the face of stereo 200. A portable computing device can be docked in receptacle 250. Two additional peripheral ports 252 are illustrated allowing additional peripheral components to be installed in car stereo 200, such as PCMCIA cards.

Vehicle stereo 200 is still operational when portable computing device 102 is not docked therein, however, the additional interface and functionality that portable computing device 102 provides is not available when portable computing device 102 is not docked therein. So, for example, the user could still select a preset channel using one of buttons 204, scan through channels, adjust the volume, etc. even though portable computing device 102 is not docked in stereo 200.

In one embodiment, user interface 218 of FIG. 4 replaces the user interface of car stereo 200 when portable computing device 102 is docked in stereo 200. For example, the source display may be blank when portable computing device 102 is docked in stereo 200, and selection of any of the pre-set keys 204 may be ignored by stereo 200 when portable computing device 102 is docked in stereo 200. Various parts of the user interface of stereo 200 may also be covered by portable computing device 102 when portable computing device 102 is docked in stereo 200. For example, the source display 202 may be located in the receptacle 250 so that it is covered by portable computing device 102 when portable computing device 102 is docked in stereo 200.

In alternate embodiments, the user interface on portable computing device 102 supplements the user interface of car stereo 200. For example, the media source display and pre-set keys 204 of FIG. 4 may remain and be operational when portable computing device 102 is docked in stereo 200.

Figure 6:
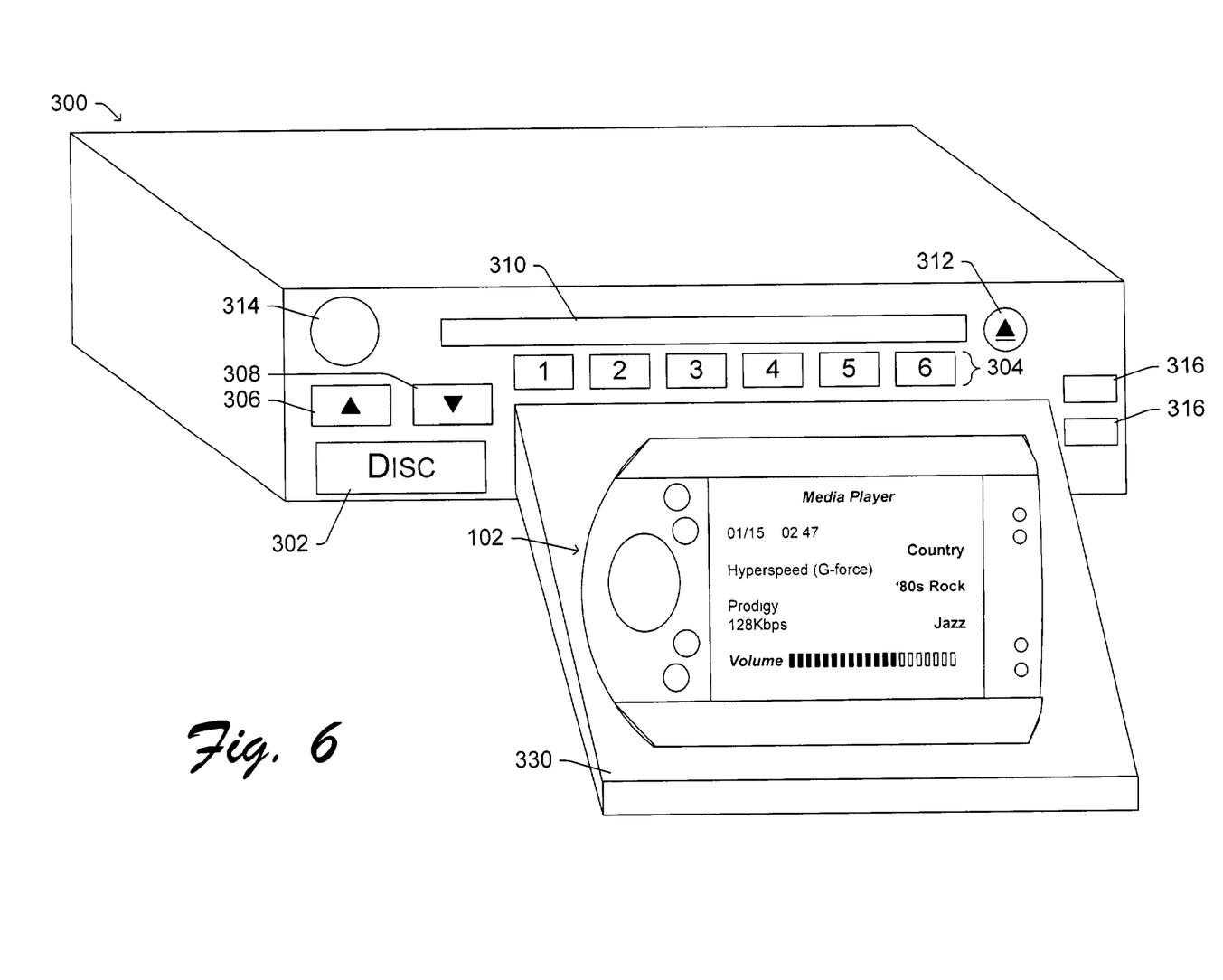
FIG. 6 illustrates another exemplary vehicle stereo with a portable computing device docked therein.

FIG. 6 illustrates another exemplary vehicle stereo with a portable computing device docked therein. In FIG. 6, the appliance that portable computing device 102 is docked in is car stereo 300. Analogous to car stereo 200 of FIG. 4, car stereo 300 incorporates typical car stereo functionality, and may also include additional "automotive PC" functionality. Car stereo 300 includes a source display 302, six pre-set buttons 304, a scan channel up button 306, a scan channel ii down button 308, a slot 310 for insertion of compact discs, an eject button 312 for ejecting compact discs, a volume control knob 314, and two peripheral device connectors 316 (e.g., USB ports).

Car stereo 300 includes a tray 330 in which portable computing device 102 is mounted. Tray 300 may be a fixed tray that extends from car stereo 300, or alternatively may be a retractable tray that need only be pulled out when a portable computing device is to be docked, and otherwise can be retracted in to stereo 300 (and thus be "out of the way").

The physical size of a car stereo in which a portable computing device can be docked can vary. In one implementation, the car stereo is a standard size allowing it to be readily mounted in the dash of many vehicles. The standard size is often expressed in terms of DINs (Deutsche Industry Normen). In one exemplary implementation, car stereo 200 of FIGS. 4 and 5, is a Double DIN size, while car stereo 300 of FIG. 6 is a DIN size. Other stereo sizes may also be used, such as those for "shaft-style" stereos, Euro DIN-style stereos, DIN-and-a-half style stereos, and so forth.

Figure 7:
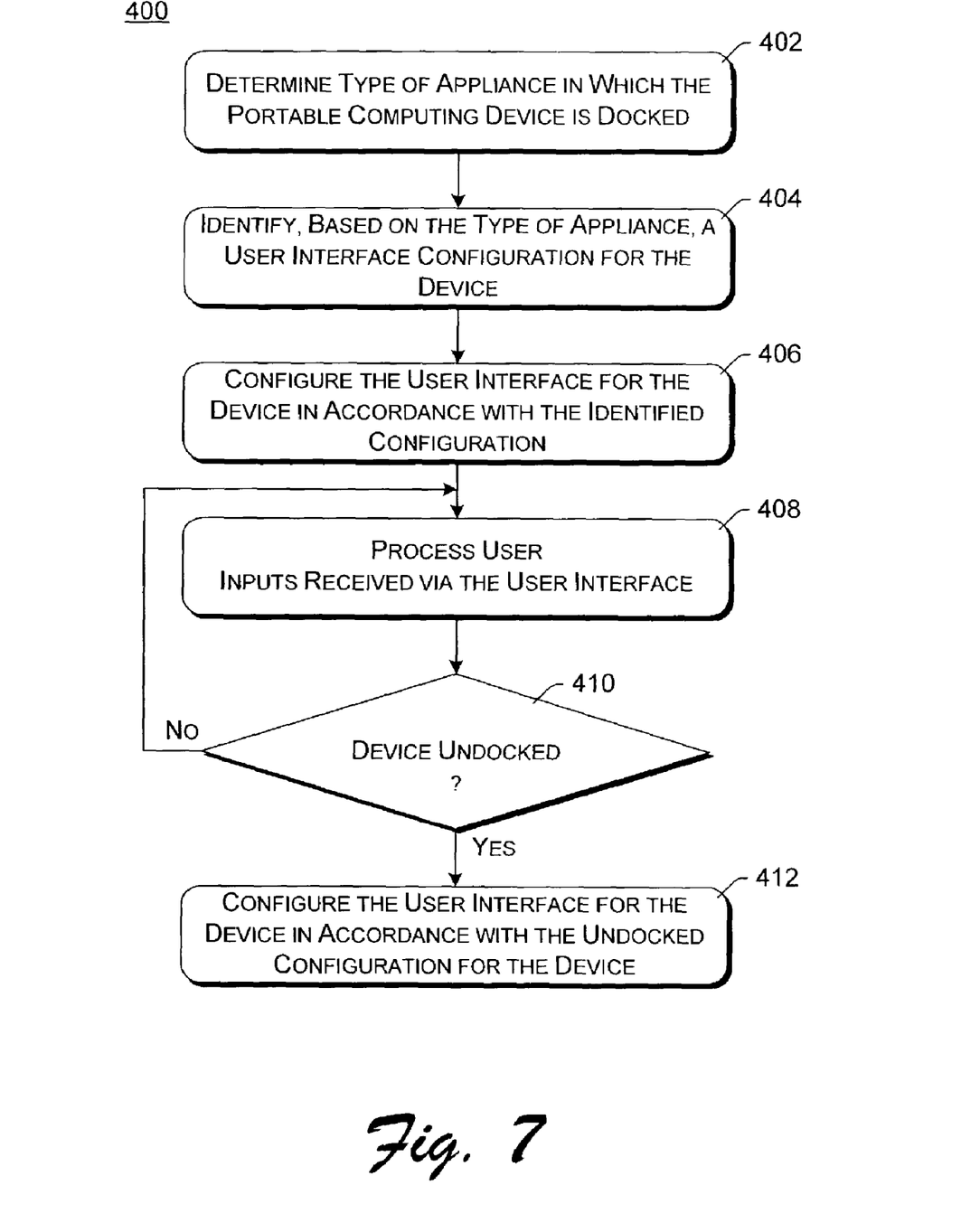
FIG. 7 is a flowchart illustrating an exemplary process for changing a user interface on a portable computing device.

FIG. 7 is a flowchart illustrating an exemplary process 400 for changing a user interface on a portable computing device. Process 400 is implemented by a portable computing device, such as portable computing device 102 of FIGS. 1–4 and 6, and may be implemented in software, firmware, hardware, or combinations thereof.

Initially, when the portable computing device is docked, a determination is made as to the type of appliance in which the portable computing device is docked (act 402). A user interface configuration for the device is then identified based on the type of appliance (act 404). The user interface for the device is configured in accordance with the identified configuration (act 406), and user inputs received via the user interface are processed appropriately (act 408). This processing continues while the device remains docked (acts 408 and 410). Once the device is undocked, the user interface for the device is configured in accordance with the undocked or standalone configuration for the device (act 412).

Figure 8:
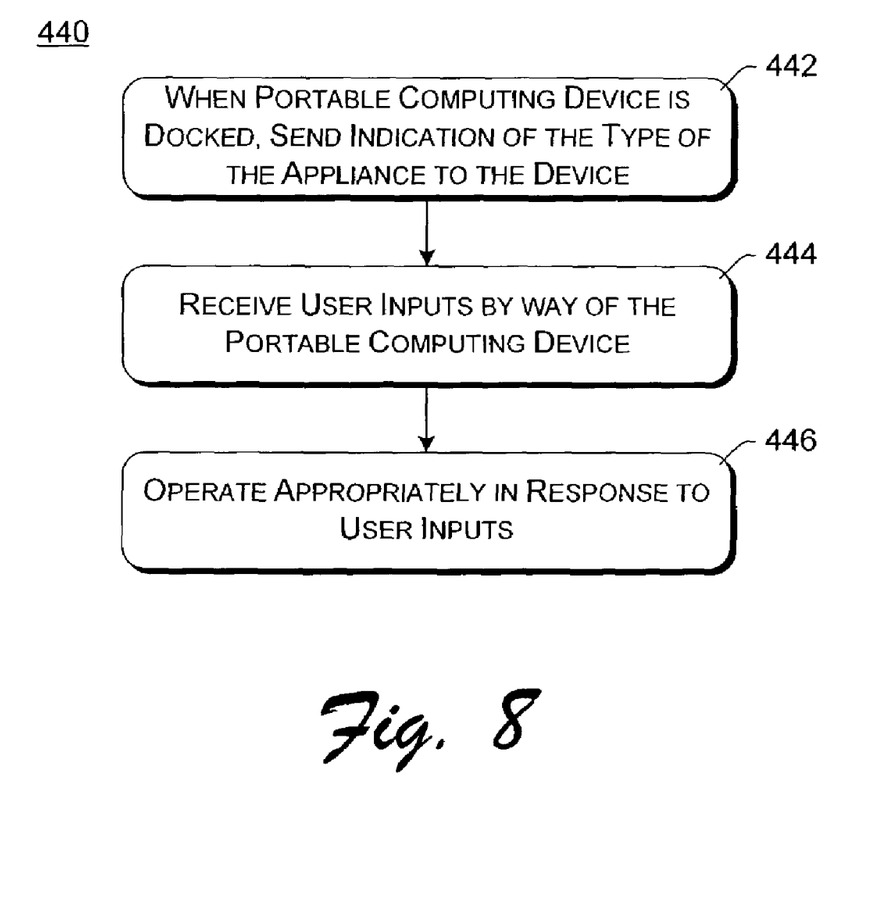
FIG. 8 is a flowchart illustrating an exemplary process for operation of an appliance.

FIG. 8 is a flowchart illustrating an exemplary process 440 for operation of an appliance. Process 440 is implemented by a appliance, such as appliance 104, 106, or 108 of FIG. 1, appliance 140 of FIG. 2, stereo 200 of FIGS. 4 and 5, or car stereo 300 of FIG. 6. Process 440 may be implemented in software, firmware, hardware, or combinations thereof.

Initially, when a portable computing device is docked, an indication of the type of the appliance is sent to the portable computing device (act 442). The appliance can detect when a portable computing device is docked in a variety of different manners, such as receiving an indication from the user (e.g., by the user pressing a button) that the portable computing device is docked, by receiving a request for a type identifier from the portable computing device, by detecting actuation of a switch which is actuated (e.g., pressed) by the housing of the portable computing device whenever the portable computing device is docked, and so forth.

The portable computing device can use the indication sent in act 442 to configure its user interface, as discussed above. The appliance receives user inputs by way of the portable computing device (act 444), and operates appropriately in response to the received user inputs (act 446).

Figure 9:
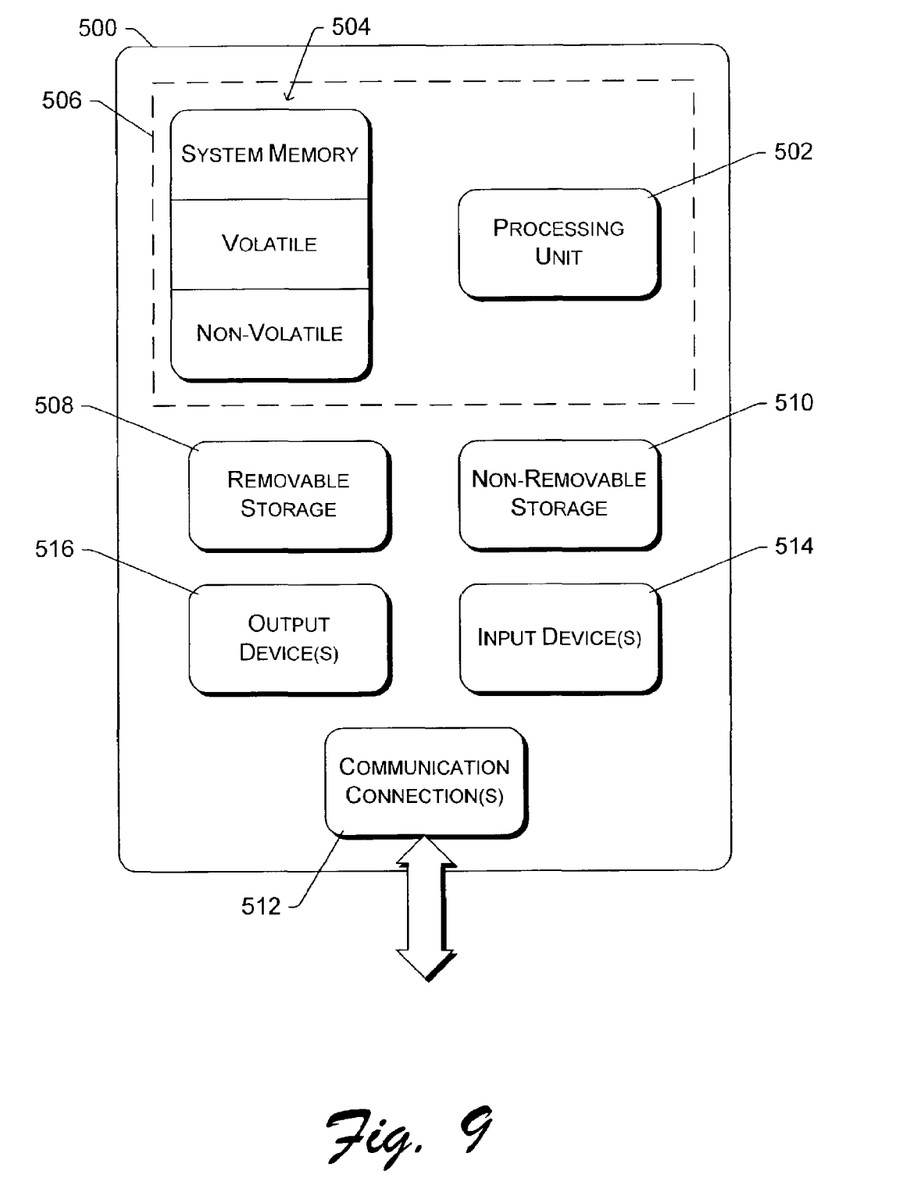
FIG. 9 illustrates an exemplary general computing device.

FIG. 9 illustrates an exemplary general computing device 500. Computing device 500 can be, for example, a portable computing device (e.g., a device 102 as discussed above) or appliance (e.g., an appliance 104, 106, 108, 140, 200, or 300 discussed above) as discussed herein. In a basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This basic configuration is illustrated in FIG. 9 by dashed line 506. Additionally, device 500 may also have additional features/functionality. For example, device 500 may also include additional storage (removable and/or non-removable), such as magnetic or optical disks or tape. Such additional storage is illustrated in FIG. 9 by removable storage 508 and non-removable storage 510.

Device 500 may also contain communications connection(s) 512 that allow the device to communicate with other devices. Device 500 may also have input device(s) 514 such as keyboard, mouse, pen, voice input device, touch input device, and so forth. Output device(s) 516 such as a display, speakers, printer, etc. may also be included.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method, implemented in a portable computing device, the method comprising:
    determining a type of an appliance in which the portable computing device is docket;
    identifying, based on the type of the appliance, a user interface configuration for the portable computing device;
    configuring a user interface of the portable computing device in accordance with the identified user interface configuration;
    saving a state of the portable computing device when the portable computing device is undocked from the appliance; and
    retrieving the saved state when the portable computing device is again docked in the appliance.

2. A method as recited in claim 1, wherein the type of the appliance comprises a vehicle stereo.

3. A method as recited in claim 1, wherein the state comprises a current song being played.

4. A method as recited in claim 1, wherein the state comprises both a current song being played and a current temporal location in the song.

5. A method as recited in claim 1, wherein determining the type of the appliance comprises receiving, from the appliance, a data packet including a type identifier for the appliance.

6. A method as recited in claim 1, wherein identifying the user interface configuration comprises receiving, from the appliance, information describing the user interface configuration for the portable computing device.

7. A method as recited in claim 1, wherein identifying the user interface configuration comprises:
    accessing a record of appliance types;
    identifying an appliance type in the record that matches the determined type; and
    using, as the user interface configuration, a user interface description associated with the identified appliance type.

8. A system comprising:
    an integrated vehicle stereo and portable computing device docking station; and
    a portable computing device configured to present a first user interface while the portable computing device is undocked, and present a second user interface while the portable computing device is docked in the docking station;
    wherein the portable computing device is further configured to:
        save a state of the portable computing device when the portable computing device is undocked from the docking station; and retrieve the saved state when the portable computing device is again docked in the docking station.

9. A system as recited in claim 8, wherein the portable computing device comprises an off-the-shelf handheld computer.

10. A system as recited in claim 8, wherein the integrated vehicle stereo and portable computing device docking station is configured to receive user inputs via a user interface of the integrated vehicle stereo and portable computing device docking station when the portable computing device is undocked and to receive user inputs via the second user interface when the portable computing device is docked in the docking station.

11. A system as recited in claim 8, wherein:
the portable computing device includes a first input/output (I/O) component through which the integrated vehicle stereo and portable computing device docking station can be sensed, and a configuration module to identify an appliance type of the integrated vehicle stereo and portable computing device docking station and determine an appropriate user interface for the portable computing device based at least in part on the identified appliance type; and
the integrated vehicle stereo and portable computing device docking station includes a second I/O component to communicate with the portable computing device when the handheld computer is docked in the docking station, and a type module to communicate, to the portable computing device through the second I/O component, an indication of the appliance type of the integrated vehicle stereo and portable computing device docking station.

12. A system as recited in claim 8, wherein the portable computing device is further configured to be an audio source for the integrated vehicle stereo and portable computing device docking station.

13. A system as recited in claim 8, wherein the integrated vehicle stereo and portable computing device docking station is configured to be an audio source to the portable computing device.

14. A system as recited in claim 8, wherein the integrated vehicle stereo and portable computing device docking station is configured to be a data source to the portable computing device.

15. A system as recited in claim 14, wherein the integrated vehicle stereo and portable computing device docking station includes an optical disc drive to operate as the data source.

16. A system as recited in claim 8, wherein the integrated vehicle stereo and portable computing device docking station is configured to operate as an extensible peripheral bus for the portable computing device.

17. A portable computing device comprising:
an input/output (I/O) component through which an appliance that the portable computing device is docked in can be sensed; and
a configuration module to identify a type of the appliance and determine an appropriate user interface for the portable computing device based at least in part on the identified type of the appliance;
wherein the configuration module is further configured to:
save a state of the portable computing device when the portable computing device is undocked from the appliance; and
retrieve the saved state when the portable computing device is again docked in the appliance.

18. A portable computing device as recited in claim 17, wherein the configuration module is further to receive, through the I/O component, a data packet from the appliance identifying the type of the appliance.

19. A portable computing device as recited in claim 17, wherein the I/O component is further to send control information to the appliance to control the operation of the appliance based on user input via the user interface.

20. A docking station comprising:
an input/output (I/O) component to communicate with an off-the-shelf handheld computer when the handheld computer is docked in the docking station; and
a type module to communicate, to the handheld computer through the I/O component, an indication of a type of the docking station to allow the handheld computer to configure its user interface based on the type of the docking station;
wherein the type of the docking station comprises an alarm clock.

21. A docking station as recited in claim 20, wherein the I/O component comprises a radio frequency (RF) transmitter.

22. A docking station as recited in claim 20, wherein the I/O component comprises an infrared (IR) transmitter.

23. A docking station as recited in claim 20, wherein the I/O component comprises an electrical contact.

24. A docking station comprising:
an input/output (I/O) component to communicate with an off-the-shelf handheld computer when the handheld computer is docked in the docking station; and
a type module to communicate, to the handheld computer through the I/O component, an indication of a type of the docking station to allow the handheld computer to configure its user interface based on the type of the docking station;
wherein the type of the docking station comprises a refrigeration appliance.

\* \* \* \* \*

UNITED STATES PATENT AND TRADEMARK OFFICE
CERTIFICATE OF CORRECTION

PATENT NO. : 6,993,615 B2
APPLICATION NO. : 10/295305
DATED : January 31, 2006
INVENTOR(S) : Falcon Page 1 of 1

It is certified that error appears in the above-identified patent and that said Letters Patent is hereby corrected as shown below:

In column 9, line 51, delete "preset" and insert -- pre-set --, therefor.

In column 10, line 14, after "306, a scan channel" delete "ii".

In column 12, line 20, in Claim 1, delete "docket" and insert -- docked --, therefor.

Signed and Sealed this

Twenty-ninth Day of September, 2009

David J. Kappos
*Director of the United States Patent and Trademark Office*